(12) United States Patent
Xiao et al.

(10) Patent No.: US 11,470,821 B2
(45) Date of Patent: Oct. 18, 2022

(54) METHOD FOR MONITORING PET BY ROBOT BASED ON GRID MAP AND CHIP

(71) Applicant: AMICRO SEMICONDUCTOR CO., LTD., Guangdong (CN)

(72) Inventors: Gangjun Xiao, Guangdong (CN); Taiming Huang, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 332 days.

(21) Appl. No.: 16/768,697

(22) PCT Filed: Jul. 6, 2018

(86) PCT No.: PCT/CN2018/094744
§ 371 (c)(1),
(2) Date: Jun. 1, 2020

(87) PCT Pub. No.: WO2019/109635
PCT Pub. Date: Jun. 13, 2019

(65) Prior Publication Data
US 2021/0169049 A1    Jun. 10, 2021

(30) Foreign Application Priority Data

Dec. 7, 2017   (CN) .......................... 201711281586.3

(51) Int. Cl.
*H04N 7/18*       (2006.01)
*A01K 29/00*      (2006.01)
(Continued)

(52) U.S. Cl.
CPC .......... *A01K 29/005* (2013.01); *G05D 1/0217* (2013.01); *G06V 20/10* (2022.01);
(Continued)

(58) Field of Classification Search
None
See application file for complete search history.

(56) References Cited

U.S. PATENT DOCUMENTS 6,439,162 B1    8/2002  van den Berg
11,016,491 B1 *  5/2021  Millard ............... G05D 1/0274
(Continued)

FOREIGN PATENT DOCUMENTS

CN     101278654 A    10/2008
CN     105706951 A    6/2016
(Continued)

*Primary Examiner* — Mushfikh I Alam
(74) *Attorney, Agent, or Firm* — Yu Gang

(57) ABSTRACT

The disclosure relates to a method for monitoring a pet by a robot based on a grid map and a chip. A mutual position relationship between the pet and the robot is determined through wireless communication between a wireless signal device on the pet and the robot, and then whether there is an obstacle cell or not between grid cells where the robot and the pet are located in the grid map is judged. If NO, it is indicated that the pet may be effectively shot at a present position and shooting direction of the robot, and the present position and shooting direction of the robot are not required to be changed. If YES, it is indicated that no pet but an obstacle may be shot at the present position of the robot.

11 Claims, 8 Drawing Sheets

(51) Int. Cl.
  *H04W 4/029* (2018.01)
  *G05D 1/02* (2020.01)
  *H04W 4/02* (2018.01)
  *G06V 20/10* (2022.01)
(52) U.S. Cl.
  CPC .............. *H04N 7/18* (2013.01); *H04W 4/023* (2013.01); *H04W 4/029* (2018.02)

(56) References Cited

U.S. PATENT DOCUMENTS

| | | | |
|---|---|---|---|
| 11,249,495 B2* | 2/2022 | Womble | G06V 20/10 |
| 2004/0093219 A1 | 5/2004 | Shin et al. | |
| 2010/0179689 A1* | 7/2010 | Lin | G05B 19/41865 700/250 |
| 2016/0075026 A1* | 3/2016 | Sisbot | G05D 1/0217 700/255 |
| 2017/0057087 A1* | 3/2017 | Lee | G01C 21/3453 |
| 2017/0131721 A1* | 5/2017 | Kwak | G05D 1/0274 |
| 2017/0166299 A1* | 6/2017 | Fujimura | G06V 40/16 |
| 2018/0025616 A1* | 1/2018 | Lin | G08B 29/185 340/501 |
| 2018/0046153 A1* | 2/2018 | Yu | G05D 1/0274 |
| 2019/0286145 A1* | 9/2019 | LaFary | G05D 1/0255 |
| 2019/0310653 A1* | 10/2019 | Lee | G05D 1/0238 |
| 2020/0047346 A1* | 2/2020 | Yang | B25J 11/008 |
| 2020/0097013 A1* | 3/2020 | Sadhu | G05B 19/41895 |
| 2020/0164521 A1* | 5/2020 | Li | G06T 7/30 |
| 2021/0018929 A1* | 1/2021 | Choi | G05D 1/0246 |
| 2021/0037793 A1* | 2/2021 | Xiao | H04W 4/021 |
| 2021/0109537 A1* | 4/2021 | Li | G05D 1/0257 |
| 2021/0138647 A1* | 5/2021 | Kim | G05D 1/0289 |
| 2021/0154835 A1* | 5/2021 | Liu | B25J 9/1664 |
| 2021/0190513 A1* | 6/2021 | Zhao | G05D 1/0272 |
| 2021/0278857 A1* | 9/2021 | Wei | B25J 9/1666 |
| 2021/0402601 A1* | 12/2021 | Wang | B25J 11/008 |
| 2022/0022716 A1* | 1/2022 | Wu | G05D 1/0274 |
| 2022/0206505 A1* | 6/2022 | Zhu | G05D 1/0221 |

FOREIGN PATENT DOCUMENTS

| | | |
|---|---|---|
| CN | 106172059 A | 12/2016 |
| CN | 106577345 A | 4/2017 |
| CN | 106584472 A | 4/2017 |
| CN | 106982741 A | 7/2017 |
| CN | 107368079 A | 11/2017 |
| CN | 108012326 A | 5/2018 |

* cited by examiner

METHOD FOR MONITORING PET BY ROBOT BASED ON GRID MAP AND CHIP

TECHNICAL FIELD

The disclosure relates to the field of robots, and particularly to a method for monitoring a pet by a robot based on a grid map and a chip.

BACKGROUND

At present, a pet robot may communicate with a positioning device worn on a pet to determine a position of the pet, thereby tracking the pet and monitoring a state of the pet through a camera. However, a monitoring position can not, be determined well by an existing robot monitoring technology, for example, there is an obstacle between a robot and a pet, and consequently, a monitoring effect may be influenced.

SUMMARY

For solving the foregoing problem, the disclosure provides a method for monitoring a pet by a robot based on a grid map and a chip, which can determine a position where the robot monitors the pet relatively well, thereby achieving a relatively good monitoring effect. The disclosure is implemented through the following specific technical solutions.

A method for monitoring a pet by a robot based on a grid map, may include:

Step 1: a present position point of the robot and a grid cell corresponding to the present position point of the robot in the grid map are determined based on the grid map constructed by the robot;

Step 2: a mutual position relationship between the pet and the robot is determined based on wireless communication between a wireless signal device on the robot and a wireless signal device on the pet, and a present position point of the pet and a grid cell corresponding to the present position of the pet are determined according to the mutual position relationship;

Step 3: whether there is an obstacle cell or not in grid cells, in a preset range covered by a shooting angle of a camera through which the robot monitors the pet, and between the grid cell where the robot is located and the grid cell where the pet is located is judged, When a judging result in Step 3 is NO, a shooting direction of the camera of the robot is kept facing to the pet and Step 2 is re-executed, and When the judging result in Step 3 is YES, Step 4 is entered;

Step 4: a preset region taking the grid cell where the pet is located as a center point is determined, passed cells are determined as monitoring cells to be determined one by one from short to long distance relationships between the passed cells in the preset region and the robot, whether there is an obstacle cell or not in a straight grid path between the monitoring cell to be determined and the grid cell where the pet is located is judged, When a judging result in Step 4 is NO, the monitoring cell to be determined is determined as a monitoring cell and Step 5 is entered, When the judging result in Step 4 is YES, whether a next passed cell is farthest from the robot or not is judged, When a judging result is that the next passed cell is not farthest from the robot, Step 4 is re-executed, and When the judging result is that the next passed cell is farthest from the robot, the next passed cell is directly determined as the monitoring cell and Step 5 is entered; and Step 5: the robot is controlled to walk from the present position point to the monitoring cell to monitor the pet, wherein the obstacle cell may be a corresponding grid cell where the robot detects an obstacle, and the passed cell is a grid cell that the robot has passed.

According to at least one alternative embodiment, the Step 1 may include:

the grid map based on an XY-axis coordinate system taking (X0, Y0) as an origin is constructed according to data detected by the robot in a walking process;

it is determined that a side length of the grid cell in the grid map is L; and based on positioning data of the robot, it is determined that a coordinate of the present position point of the robot is (X1, Y1) and a grid coordinate of the grid cell corresponding to the present position point is (S11, S12), S11=(X1−X0)/L, S12=(Y1−Y0)/L, both S11 and S12 being integers.

According to at least one alternative embodiment, the Step 2 may include:

it is determined that a distance between a first Ultra Wideband (UWB) positioning base station and a second UWB positioning base station on a body of the robot is W;

it is determined that a coordinate of the first UWB positioning base station is (X11, Y11) and a coordinate of the second UWB positioning base station is (X12, Y12), based on wireless communication between each of the first UWB positioning base station and the second UWB positioning base station and a UWB positioning tag on the pet, it is determined that a first distance between the UWB positioning tag and the first UWB positioning base station is R1 and a second distance between the UWB positioning tag and the second UWB positioning base station is R2;

it is determined that an included angle between lines taking the first UWB positioning base station as an angular vertex and pointing to the second UWB positioning base station and the UWB positioning tag respectively is a first included angle, the first included angle being α1 and α1=arccos($(W^2+R2^2−R1^2)/(2*W*R2)$);

it is determined that an included angle between lines taking the second UWB positioning base station as an angular vertex and pointing to the first UWB positioning base station and the UWB positioning tag respectively is a second included angle, the second included angle being α2 and α2=arccos($(W^2+R1^2−R2^2)/(2*W*R1)$);

it is determined that a coordinate of a present position point of the UWB positioning tag is (Xc, Yc), Xc=X12+R2*cos(180°−α1−arccos((X12−X11)/W)) and Yc=Y11+R1*cos(180°−α2−arcsin((X12−X11)/W)); and it is determined that a grid coordinate of a grid cell corresponding to the present position point of the UWB positioning tag is (S21, S22), S21=(Xc−X0)/L, S22=(Yc−Y0)/L, both S21 and S22 being integers.

According to at least one alternative embodiment, the operation that it is determined that the coordinate of the first UWB positioning base station on the body of the robot is (X11, Y11) and the coordinate of the second UWB positioning base station is (X12, Y12) may include:

a coordinate of a center point of the body of the robot is determined as the coordinate of the present position point of the robot, the coordinate being (X1, Y1);

it is determined that the center point of the body of the robot is a midpoint of a connecting line of the first UWB positioning base station and the second UWB positioning base station;

it is determined that a distance between the first UWB positioning base station and the second UWB positioning base station is W, a distance between the center point of the body of the robot and the first UWB positioning base station is W/2 and a distance between the center point of the body of the robot and the second UWB positioning base station is W/2;

it is determined that a present direction, detected by a gyroscope of the robot, of the robot is $\alpha$;

it is determined that the coordinate of the first UWB positioning base station on the body of the robot is (X11, Y11), X11=X1−((W*cos$\alpha$)/2) and Y11=Y1+((W*sin$\alpha$)/2; and it is determined that the coordinate of the second UWB positioning base station on the body of the robot is (X12, Y12), X12=X1+((W*cos$\alpha$)/2) and Y12=Y1−((W*sin$\alpha$)/2).

According to at least one alternative embodiment, the operation that it is determined that the first distance between the UWB positioning tag and the first UWB positioning base station is R1 and the second distance between the UWB positioning tag and the second UWB positioning base station is R2 may include:

it is determined that a propagation speed of a radio wave is c;

it is determined that a duration from a time point of sending distance measurement data to the UWB positioning tag by the first UWB positioning base station to a time point of receiving a confirmation signal of the UWB positioning tag is T11;

it is determined that a duration from a time point of receiving by the UWB positioning tag, the distance measurement data sent by the first UWB positioning base station to a time point of sending the confirmation signal is T12;

it is determined that a duration from a time point of sending distance measurement data to the first UWB positioning base station by the UWB positioning tag to a time point of receiving a confirmation signal of the first UWB positioning base station is T13;

it is determined that a duration from a time point of receiving by the first UWB positioning base station, the distance measurement data sent by the UWB positioning tag to a time point of sending the confirmation signal is T14;

it is determined that the first distance between the UWB positioning tag and the first UWB positioning base station is R1, R1=c*(T11−T12+T13−T14)/4;

it is determined that a duration from a time point of sending distance measurement data to the UWB positioning tag by the second UWB positioning base station to a time point of receiving a confirmation signal of the UWB positioning tag is T21;

it is determined that a duration from a time point of receiving by the UWB positioning tag, the distance measurement data sent by the second UWB positioning base station to a time point of sending the confirmation signal is T22;

it is determined that a duration from a time point of sending distance measurement data to the second UWB positioning base station by the UWB positioning tag to a time point of receiving a confirmation signal of the second UWB positioning base station is T23;

it is determined that a duration from a time point of receiving by the second UWB positioning base station, the distance measurement data sent by the UWB positioning tag to a time point of sending the confirmation signal is T24; and it is determined that the second distance between the UWB positioning tag and the second UWB positioning base station is R2, R2=c*(T21−T22+T23−T24)/4.

According to at least one alternative embodiment, the Step 3 may include:

a direction that the camera through which the robot monitors the pet faces the pet is determined as the shooting direction;

a shooting region covered by the shooting angle of the camera, in the grid map is determined according to the shooting direction;

grid cells corresponding to a coverage region of an angle range in the grid map are determined, the angle range being formed by a first angle arm and second angle arm extending outwards by taking the camera as an angular vertex, the coverage region being smaller than and in the shooting region; and whether there is the obstacle cell or not in the grid cells corresponding to the coverage region is analyzed.

According to at least one alternative embodiment, the Step 4 may include:

a circular region taking a center of the grid cell where the pet is located as a circle center and taking a preset length as a radius is determined;

a passed cell at a shortest distance away from the robot in the circular region is determined as a monitoring cell to be determined;

if there is an obstacle cell in a straight grid path between the monitoring cell to be determined and the grid cell where the pet is located and a passed cell at a second shortest distance away from the robot in the circular region is not farthest from the robot, the passed cell at the second shortest distance away from the robot in the circular region is determined as a monitoring cell to be determined;

if there is an obstacle cell in a straight grid path between the monitoring cell to be determined and the grid cell where the pet is located and a passed cell at a third shortest distance away from the robot in the circular region is not farthest from the robot, the passed cell at the third shortest distance away from the robot in the circular region is determined as a monitoring cell to be determined; and above operations on next passed cell are gone on being executed; until the robot determines the passed cell at the second farthest from the robot in the circular region as the monitoring cell to be determined.

According to at least one alternative embodiment, the preset length may be any value in a range from 1 meter to 2 meters.

According to at least one alternative embodiment, the Step 5 may include:

the grid map is searched at a direction on the monitoring cell, from a starting point that is the present position point of the robot;

a grid path with a shortest path length in grid paths directly connected by passed cells between the present position point of the robot and a center point of the monitoring cell is determined as a navigation grid path;

center points of the grid cells in the navigation grid path are determined as navigation position points, and the navigation position points are connected into a navigation path;

the robot is controlled to walk along the navigation path from the present position point to a monitoring position point; and a direction of the robot is regulated to ensure that the shooting direction of the camera of the robot is a direction of the pet.

A chip may be configured to store a program, the program being configured to control the robot to execute the above-mentioned method for monitoring a pet by a robot based on a grid map.

The disclosure has the following beneficial effects. The mutual position relationship between the pet and the robot is determined through wireless communication between the wireless signal device on the pet and the robot, and then whether there is an obstacle cell or not between the corresponding grid cells where the robot and the pet are located, in the grid map is judged to judge whether there is an obstacle between the robot and the pet or not. When a judgment result is that there is no obstacle between the robot and the pet, it is indicated that the pet may be effectively shot at a present position and shooting direction of the robot, and the present position and shooting direction of the robot are not required to be changed. When the judgment result is that there is an obstacle between the robot and the pet, it is indicated that no pet but an obstacle may be shot at the present position of the robot, so that the robot is required to judge states of grid cells around the pet to reselect a monitoring position point. The passed cells in the preset region around the pet are selected from short to long distance relationships with the robot and determined as monitoring cells to be determined one by one, then whether there is an obstacle cell or not in the straight grid path between the monitoring cell to be determined and the grid cell where the pet is located is judged, namely whether the pet may be effectively monitored or not at the position of the monitoring cell to be determined is analyzed, if there is no obstacle, the monitoring cell to be determined is determined as the monitoring cell, and if there is an obstacle, the next passed cell is analyzed. In such a manner of analyzing the passed cells in the preset region around the pet one by one from short to long distances away from the robots, a position point that the robot is able to reach fastest and where the pet may be effectively monitored is able to be found, so that efficiency of monitoring the pet by the robot is improved. In addition, if there are obstacles between all the other passed cells, except the passed cell farthest from the robot, in the preset region and the pet, the passed cell farthest from the robot is determined as the monitoring cell no matter whether there is an obstacle between it and the pet or not, and this is because distribution of obstacles has a characteristic under a normal condition, namely the obstacles may usually be concentrated in one region or some regions, if an obstacle cell is detected in a region, there may be other obstacle cells in the region, and if the robot detects an obstacle at the present position, in a certain range, the probability of occurrence of an obstacle is lower in a region farther from the present position. Therefore, determining the passed cell farthest from the robot in the preset range as the monitoring cell may ensure that the robot is in a relatively open region and, when the position of the pet changes, the monitoring position or monitoring angle may be conveniently regulated at a low probability of interference of an adjacent obstacle, which improves the monitoring efficiency.

From the above, according to the disclosure, the robot may be controlled to find a relatively good monitoring position in such a manner of monitoring the pet in combination with the grid map, so that the problem that the pet is easily obstructed by an obstacle to influence the monitoring effect is solved, and the pet monitoring effect is improved.

BRIEF DESCRIPTION OF THE DRAWINGS

FIG. 6 is an analysis diagram of determining a grid region shot by a robot;

DETAILED DESCRIPTION OF THE EMBODIMENTS

Specific implementation modes of the disclosure will further be described below in combination with the drawings.

A robot of the disclosure is one of intelligent household appliances and may automatically walk in some scenarios by virtue of certain artificial intelligence. A body of the robot is provided with various sensors, may detect a walking distance, a walking angle, a body state, an obstacle and the like, for example, may automatically turn in front of a wall or another obstacle, may walk along different routes as planned according to different settings and may also construct a grid map according to various data detected in a walking process. The mobile robot of the disclosure includes the following structures: the body of the robot with a driving wheel and capable of autonomously walking, a human-computer interaction interface arranged on the body and an obstacle detection unit arranged on the body. A camera is arranged on an upper end face of a middle part of the body. Of course, the camera may also be arranged on an upper end face of a front part of the body or at another position. When the camera is arranged at the front part of the body or the other position and a related parameter is calculated, a related numerical value is required to be correspondingly regulated relative to the camera arranged at the middle part. An inertia sensor is arranged in the body, and the inertia sensor includes an accelerometer, a gyroscope and the like. An odometer (usually a code disc) configured to detect the walking distance of the driving wheel is arranged on the driving wheel, and a control module capable of processing a parameter of the related sensor and outputting a control signal to an execution component is also arranged.

Figure 1:
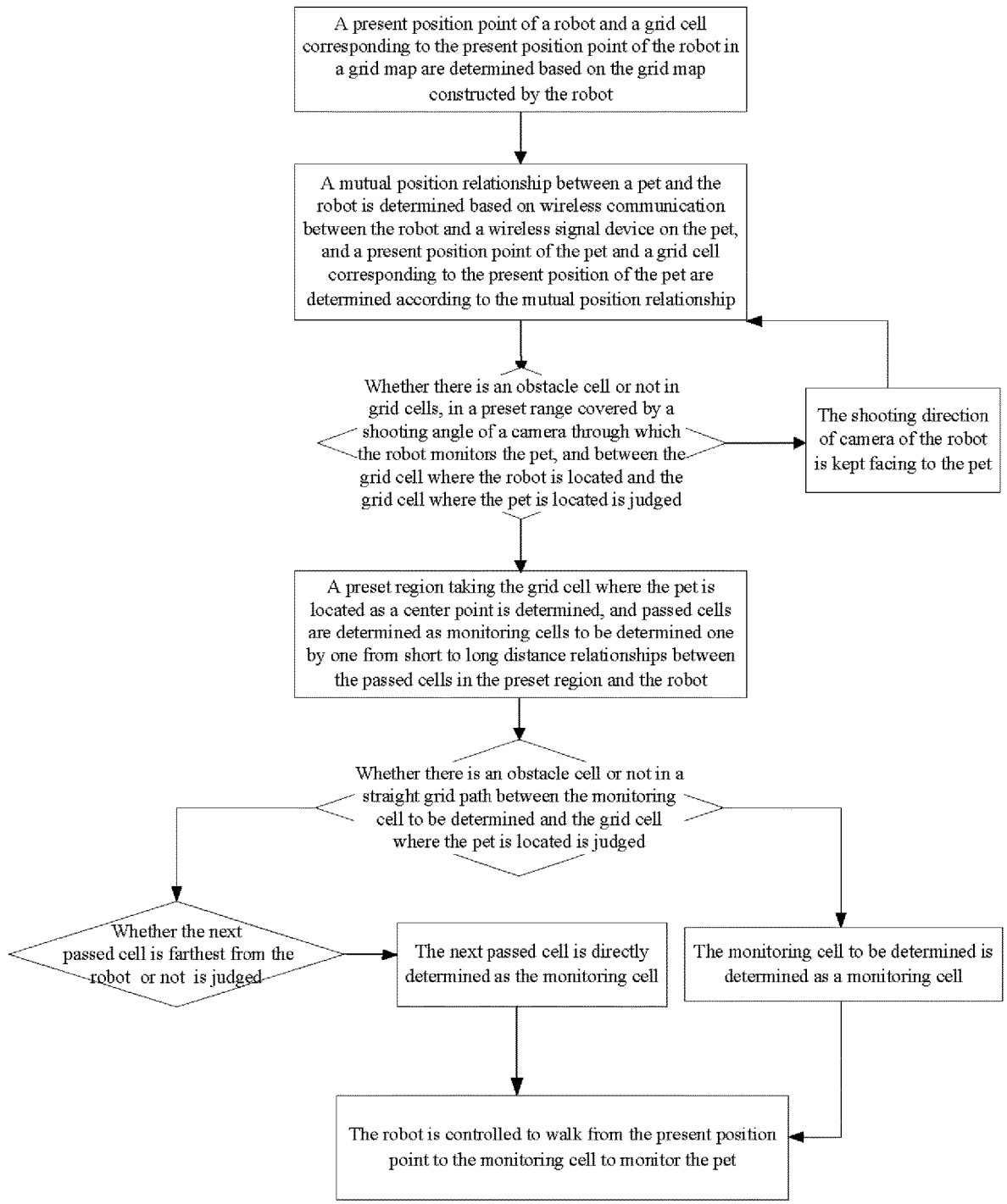
FIG. 1 is a flowchart of a method for monitoring a pet by a robot based on a grid map according to the disclosure.

A method of the disclosure for monitoring a pet by a robot based on a grid map, as shown in FIG. 1, includes the following steps. Step 1: a present position point of the robot and a grid cell corresponding to the present position of the robot, in the grid map are determined based on the grid map constructed by the robot. Step 2: a mutual position relationship between the pet and the robot is determined based on wireless communication between the robot and a wireless signal device on the pet, and a present position point of the pet and a grid cell corresponding to the present position point of the pet are determined according to the mutual position relationship. Step 3: whether there is an obstacle cell or not in grid cells, in a preset range covered by a shooting angle of a camera through which the robot monitors the pet, and between the grid cell where the robot is located and the grid cell where the pet is located is judged, when a judging result in Step 3 is NO, a shooting direction of the camera of the robot is kept facing to the pet and Step 2 is re-executed, and when the judging result in Step 3 is YES, Step 4 is entered. Step 4: a preset region taking the grid cell where the pet is located as a center point is determined, passed cells are determined as monitoring cells to be determined one by one from short to long distance relationships between the passed cells in the preset region and the robot, whether there is an obstacle cell or not in a straight grid path between the monitoring cell to be determined and the grid cell where the pet is located is judged, when a judging result in Step 4 is NO, the monitoring cell to be determined is determined as a monitoring cell and Step 5 is entered, when the judging result in Step 4 is YES, whether a next passed cell is farthest from the robot or not is judged, when a judging result is that the next passed cell is not farthest from the robot, Step 4 is re-executed, and when the judging result is that the next passed cell is farthest from the robot, the next passed cell is directly determined as the monitoring cell and Step 5 is entered. Step 5: the robot is controlled to walk from the present position point to the monitoring cell to monitor the pet. The grid map is a map constructed by the robot in a walking process according to data detected by various sensors thereof and taking grid cell as a basic unit. The grid cell is a virtual check with a set length and width, may be set to be a square and may also be set to be a rectangle. As an example embodiment, the grid cell of the disclosure is a square check with a side length of 0.2 meter. The wireless signal device may adopt a zigbee communication module, an ultrasonic module, a radio frequency communication module, a UWB module, a Wireless Fidelity (WIFI) module or the like, and for example, is correspondingly selected according to different requirements of a product. The preset range may also be correspondingly set according to different design requirements of the product, and as an example, is set to be ⅓ of the whole range covered by the shooting angle of the camera. The preset range may also be corresponding set according to different design requirements of the product, and as an example, may be set to be a circular region, a square region, a regular polygonal region or the like, and an area is usually set in a range of 2 to 6 square meters.

In the walking process, the robot may mark a passed grid cell as a passed cell, mark a corresponding grid cell where an obstacle is detected as an obstacle cell, mark a corresponding grid cell when a cliff is detected as a cliff cell, etc. and update the grid map according to marked information. According to the method of the disclosure, the mutual position relationship between the pet and the robot is determined through wireless communication between the wireless signal device on the pet and the robot, and then whether there is an obstacle cell or not between the corresponding grid cells where the robot and the pet are located in the grid map is judged to judge whether there is an obstacle between the robot and the pet or not. If NO, it is indicated that the pet may be effectively shot at the present position and shooting direction of the robot, the present position and shooting direction of the robot are not required to be changed. If the pet runs, the body of the robot may rotate to keep the camera always facing the direction of the pet, and in this process, the robot is not required to walk to another position unless there is an obstacle. If YES, it is indicated that no pet but an obstacle may be shot at the present position of the robot, so that the robot is required to judge states of grid cells around the pet to reselect a monitoring position point. The passed cells in the preset region around the pet are selected from short to long distance relationships with the robot and determined as monitoring cells to be determined one by one, then whether there is an obstacle cell or not in the straight grid path between the monitoring cell to be determined and the grid cell where the pet is located is judged, namely whether the pet may be effectively monitored or not at a position of the monitoring cell to be determined is analyzed, if there is no obstacle, the monitoring cell to be determined is determined as the monitoring cell, and if there is an obstacle, the next passed cell is analyzed. In such a manner of analyzing the passed cells in the preset region around the pet one by one from short to long distances away from the robots, a position point that the robot may reach fastest and where the pet may be effectively monitored may be found, so that efficiency of monitoring the pet by the robot is improved. In addition, if there are obstacles between all the other passed cells, except the passed cell farthest from the robot, in the preset region and the pet, the passed cell farthest from the robot is determined as the monitoring cell no matter whether there is an obstacle between the robot and the pet or not. This is because distribution of obstacles has a characteristic under a normal condition, namely the obstacles may usually be concentrated in one region or some regions, if an obstacle cell is detected in a region, there may be other obstacle cells in the region, and if the robot detects an obstacle at the present position, in a certain range, the probability of occurrence of an obstacle is lower in a region farther from the present position. Therefore, determining the passed cell farthest from the robot in the preset range as the monitoring cell may ensure that the robot is in a relatively open region and, when the position of the pet changes, the monitoring position or monitoring angle may be conveniently regulated at a low probability of interference of an adjacent obstacle, which improves the monitoring efficiency. From the above, according to the method of the disclosure, the robot may be controlled to find a relatively good monitoring position in such a manner of monitoring the pet in combination with the grid map, so that the problem that the pet is easily obstructed by an obstacle to influence the monitoring effect is solved, and the pet monitoring effect is improved.

Figure 2:
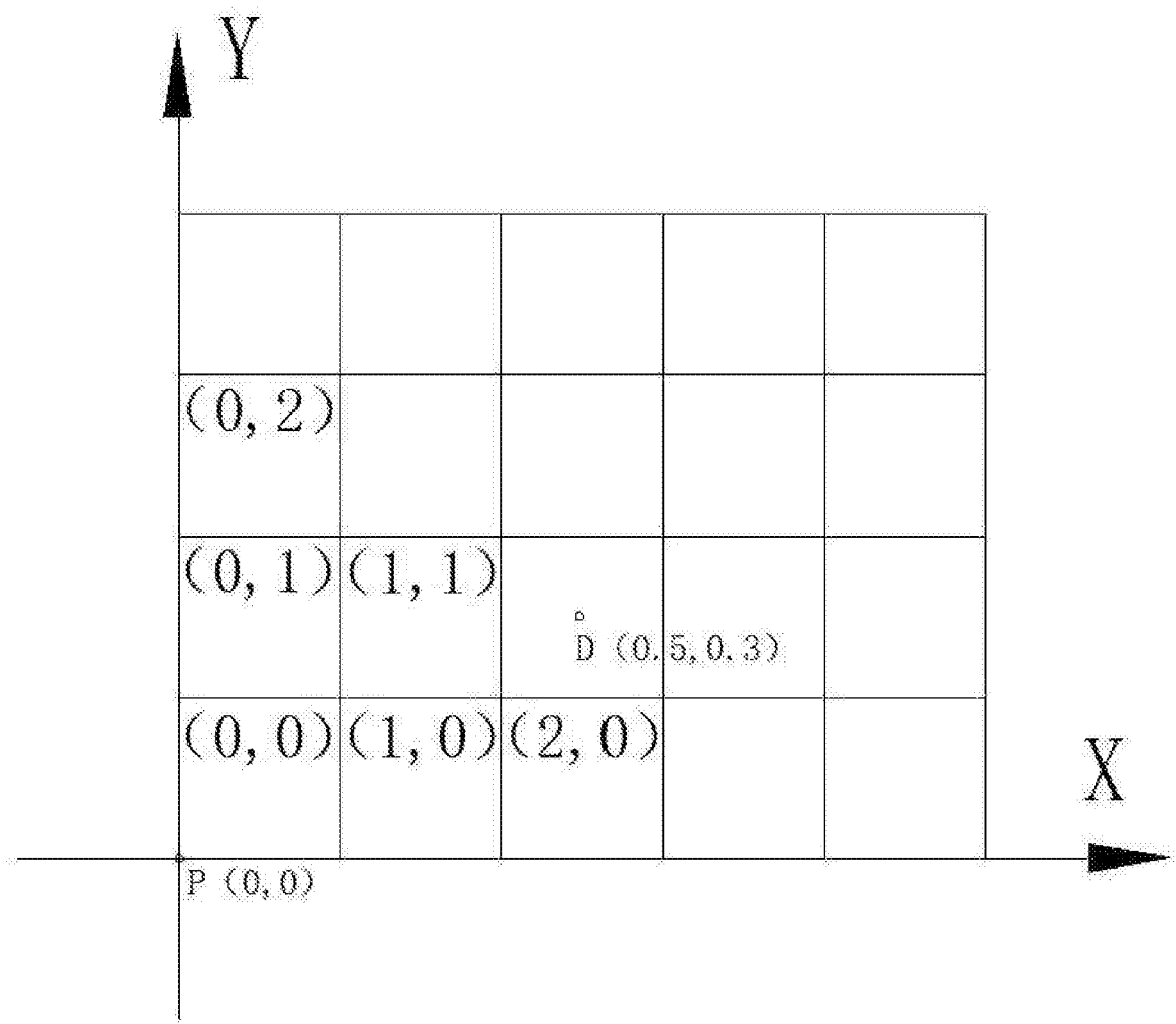
FIG. 2 is an analysis diagram of converting a coordinate of a position point into a coordinate of a grid cell according to the disclosure.

According to at least one alternative embodiment, the operation in Step 1 that the present position point of the robot in the grid map and the corresponding grid cell are determined based on the grid map constructed by the robot includes: the grid map based on an XY-axis coordinate system taking (X0, Y0) as an origin is constructed according to data detected by the robot in a walking process; it is determined that a side length of the grid cell in the grid map is L; and based on own positioning data of the robot, it is determined that a coordinate of the present position point of the robot is (X1, Y1) and a grid coordinate of the grid cell corresponding to the present position point is (S11, S12), S11=(X1−X0)/L, S12=(Y1−Y0)/L, both S11 and S12 being integers. Since the robot, in the walking process, may record a passed path based on the data detected by its own sensors such as the odometer and the gyroscope and determine its own position and direction (i.e., the positioning data) in real time. The grid map is formed by taking grid cell as the basic unit, each grid cell includes multiple position points, and the robot walks according to the position points, namely moving from the present position point to a next adjacent position point. Therefore, when the coordinate of the grid cell where the robot is presently located is determined, it is necessary to convert the coordinate of the present position point into the coordinate of the grid cell. As shown in FIG. 2, each small check represents a grid cell, the side length is L=0.2 meters, a coordinate of the coordinate origin P is (X0=0, Y0=0), and a grid coordinate of a grid cell in the upper right corner of the origin P is set to be (0, 0). When the robot is at a position point D, the coordinate thereof is detected to be (0.5, 0.3), and the grid coordinate of the grid cell where the robot is located is calculated to be (S11=((0.5−0)/0.2) and S12=((0.3−0)/0.2)), i.e., (S11=2.5, S12=1.5), which is rounded to be (S11=2, S12=1), so that, when the robot is at the position point D, the grid coordinate of the corresponding grid cell is (2, 1). According to the method of the disclosure, in the same coordinate system, the grid coordinate of the grid cell corresponding to the present position point can be accurately calculated through a position relationship between the present position point and the coordinate origin and the side length of the grid cell, thereby providing reliable data for subsequent data processing and improving the data analysis accuracy.

Figure 3:
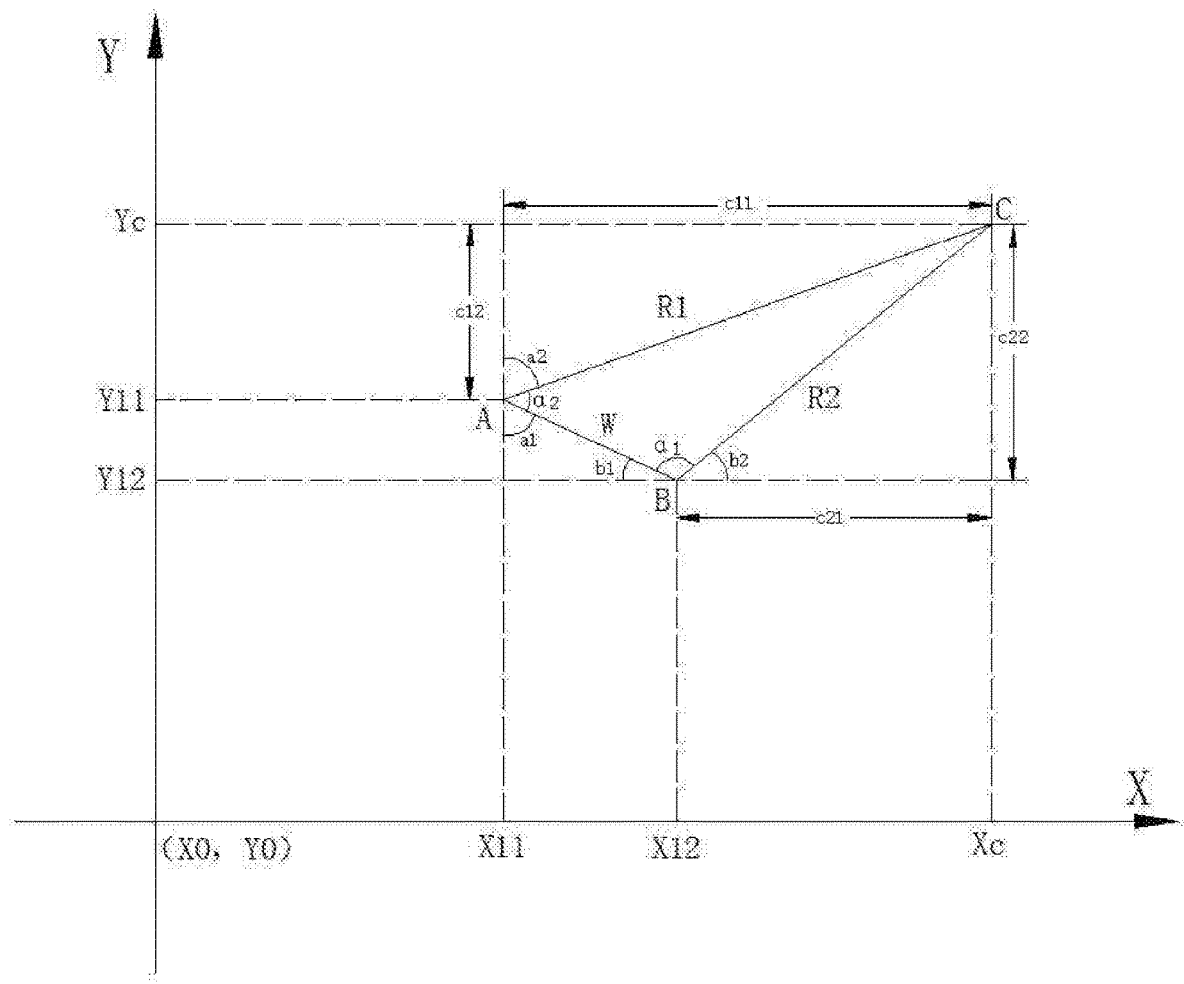
FIG. 3 is a mutual position analysis diagram of two UWB positioning base stations and a UWB positioning tag according to the disclosure.

According to at least one alternative embodiment, the operation in Step 2 that the mutual position relationship between the pet and the robot is determined based on wireless communication between the robot and the wireless signal device on the pet and the present position point of the pet and the corresponding grid cell are determined according to the mutual position relationship includes: it is determined that a distance between a first UWB positioning base station and second UWB positioning base station on a body of the robot is W; it is determined that a coordinate of the first UWB positioning base station is (X11, Y11) and a coordinate of the second UWB positioning base station is (X12, Y12); based on wireless communication between each of the first UWB positioning base station and the second UWB positioning base station and a UWB positioning tag on the pet, it is determined that a first distance between the UWB positioning tag and the first UWB positioning base station is R1 and a second distance between the UWB positioning tag and the second UWB positioning base station is R2; it is determined that an included angle between lines taking the first UWB positioning base station as an angular vertex and pointing to the second UWB positioning base station and the UWB positioning tag respectively is a first included angle, the first included angle being α1 and α1=arccos($(W^2+R2^2-R1^2)/(2*W*R2)$); it is determined that an included angle between lines taking the second UWB positioning base station as an angular vertex and pointing to the first UWB positioning base station and the UWB positioning tag respectively is a second included angle, the second included angle being α2 and α2=arccos($(W^2+R1^2-R2^2)/(2*W*R1)$); it is determined that a coordinate of a present position point of the UWB positioning tag is (Xc, Yc), Xc=X12+R2*cos(180°−α1−arccos((X12−X11)/W)) and Yc=Y11+R1*cos(180°−α2−arcsin((X12−X11)W)); and it is determined that a grid coordinate of a grid cell corresponding to the present position point of the UWB positioning tag is (S21, S22), S21=(Xc−X0)/L, S22=(Yc−Y0)/L, both S21 and S22 being integers. UWB is a UWB carrierless communication technology, and the UWB positioning tag and the UWB positioning base station are communication device adopting the UWB communication technology. As shown in FIG. 3, A is the first UWB positioning base station, B is the second UWB positioning base station, and C is the UWB positioning tag. Both the first UWB positioning base station and the second UWB positioning base station are assembled on the body of the robot, and the UWB positioning tag is worn on the pet. Since the distance between the first UWB positioning base station and the second UWB positioning base station has been determined when the robot is designed and produced, the distance therebetween is known, namely AB=W, and related data has been recorded in the system. A numerical value of W may be correspondingly set according to a specific product design, and the numerical value of W should be less than a diameter of the body of the robot. In addition, it is measured that the distance between the first UWB positioning base station and the UWB positioning tag is AC=R1 and the distance between the second UWB positioning base station and the UWB positioning tag is BC=R2, a magnitude of the first included angle (∠ABC) may be calculated according to three side lengths of the triangle, namely α1=arccos($(W^2+R2^2-R1^2)/(2*W*R2)$), and a magnitude of the second included angle (∠CAB) is similarly calculated, namely α2=arccos($(W^2+R1^2-R2^2)/(2*W*R1)$). Since the robot may determine its own coordinate position (i.e., the coordinate of the center point of the robot) according to the data detected by the sensors such as the odometer and the gyroscope, coordinate values of the two UWB positioning base stations at fixed positions relative to the center point on the body of the robot can also be determined, namely the coordinate of the first UWB positioning base station is (X11, Y11) and the coordinate of the second UWB positioning base station is (X12, Y12). A specific calculation manner will be described in the following embodiments. It can be seen from the figure that, for determining an X-axis coordinate of a point C, it is necessary to know the length c11 or c21, c11=R1*sina2, c21=R2*cosb2, ∠a2=180°−α2−∠a1, ∠b2=180°−α1−∠b1, ∠a1=arcsin((X12−X11)/W) and ∠b1=arccos((X12−X11)/W), and the angles α1 and α2 have been calculated before, so that c11=R1*sin(180°−α2−arcsin((X12−X11)/W)) and c21=R2*cos(180°−α1−arcsin((Y11−Y12)NV)) are calculated, and in such case, the X-axis coordinate of the point C where the pet is located is Xc=X12+c21=X12+R2*cos(180°−α1−arccos((X12−X11) W)) or Xc=X11+c11=X11+R1*sin(180°−α2−arcsin((X12−X11)W)). Similarly, for determining a Y-axis coordinate of the point C, it is necessary to know the length c12 or c22, c12=R1*cosa2, c22=R2*sinb2, ∠a2=180°−α2−∠a1, ∠b2=180°−α1−∠b1, ∠a1=arcsin((X12−X11)/w), ∠b1=arccos((X12−X11)/W) and the angles α1 and α2 have been calculated before, so that c12=R1*cos(180°−α2−arcsin ((X12−X11)W)) and c22=R2*sin(180°−α1−arccos((X12−X11)W)) are calculated, and in such case, the Y-axis coordinate of the point C where the pet is located is Yc=Y11+c12=Y11+R1*cos(180°−α2−arcsin((X12−X11)W)) or Yc=Y12+c22=Y12+R2*sin(180°−α1−arccos((X12−X11)/W)). After the coordinate of the present position point of the UWB positioning tag is determined to be (Xc, Yc), the grid coordinate of the grid cell corresponding to the present position point of the UWB positioning tag is calculated to be (S21, S22) in the manner described in the abovementioned embodiment, namely S21=(Xc−X0)/L and S22=(Yc−Y0)/L, both S21 and S22 being integers. The method of the disclosure is applied to the condition that a height of the UWB positioning tag worn on the pet and heights of the UWB positioning base stations of the robot are consistent (namely the three communication devices are on the same horizontal plane) or not greatly different. When the positions of the robot and the pet change, a detected change parameter may be substituted to rapidly obtain the position point of the pet and the corresponding grid coordinate, a data processing speed is high, and an output result is accurate. In addition, if difference values between the height of the UWB positioning tag and the heights of the UWB positioning base stations are relatively great, a third UWB positioning base station is required to be arranged on the body of the robot, and a height parameter is introduced to determine a three-dimensional coordinate of the UWB positioning tag. The implementation manner for determination of the corresponding grid coordinate adopts the principle of the embodiment and will not be elaborated herein. Compared with another existing positioning manner, the manner of positioning the pet through the UWB communication technology is larger in positioning range, higher in accuracy and higher in stability.

Figure 4:
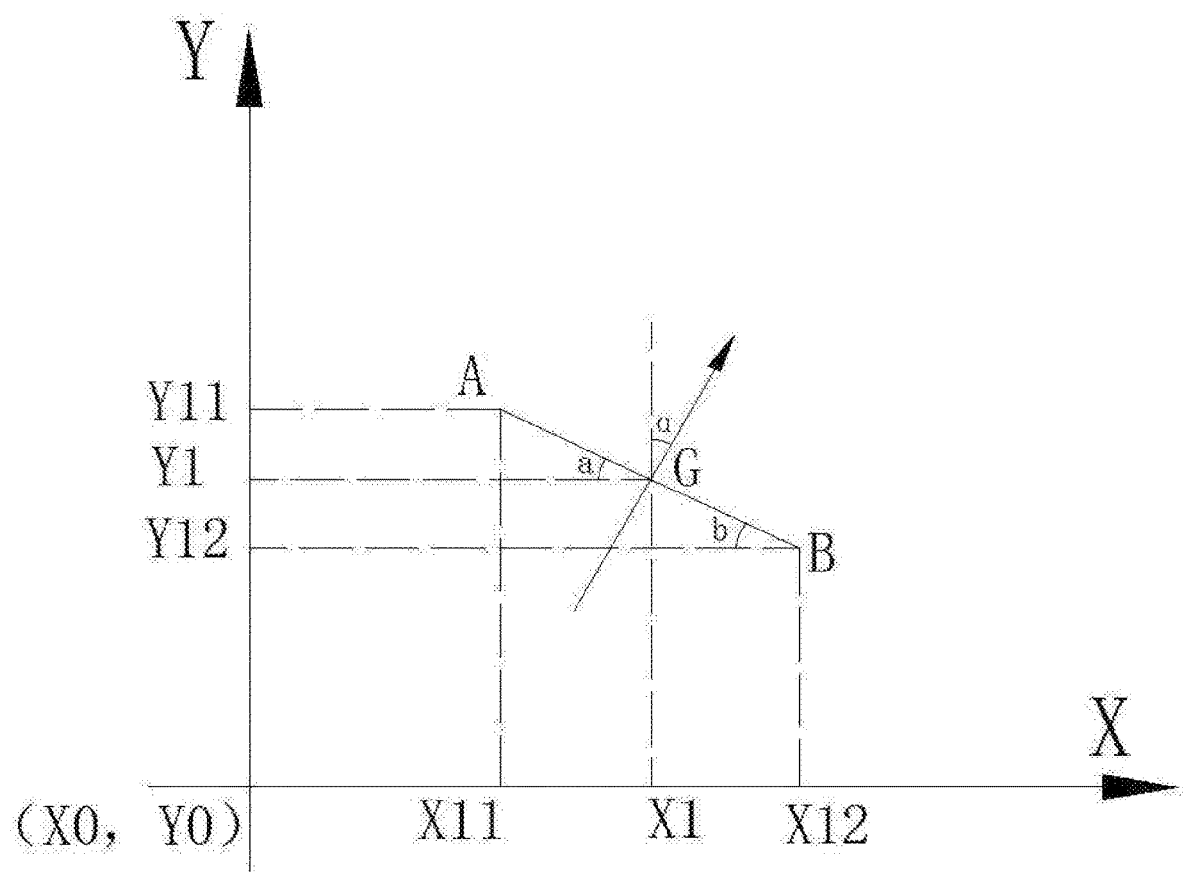
FIG. 4 is an analysis diagram of calculating coordinates of two UWB positioning base stations according to a coordinate of a center point of a robot according to the disclosure.

According to at least one alternative embodiment, the operation that it is determined that the coordinate of the first UWB positioning base station on the body of the robot is $(X11, Y11)$ and the coordinate of the second UWB positioning base station is $(X12, Y12)$ includes: a coordinate of a center point of the body of the robot is determined as the coordinate of the present position point of the robot, the coordinate being $(X1, Y1)$; it is determined that the center point of the body of the robot is a midpoint of a connecting line of the first UWB positioning base station and the second UWB positioning base station; it is determined that the distance between the first UWB positioning base station and the second UWB positioning base station is W, a distance between the center point of the body of the robot and the first UWB positioning base station is W/2 and a distance between the center point of the body of the robot and the second UWB positioning base station is W/2; it is determined that a present direction, detected by a gyroscope of the robot, of the robot is $\alpha$; it is determined that the coordinate of the first UWB positioning base station on the body of the robot is $(X11, Y11)$, $X11=X1-((W*\cos\alpha)/2)$ and $Y11=Y1+((W*\sin\alpha)/2)$; and it is determined that the coordinate of the second UWB positioning base station on the body of the robot is $(X12, Y12)$, $X12=X1+((W*\cos\alpha)/2)$ and $Y12=Y1-((W*\sin\alpha)/2)$. As shown in FIG. 4, the first UWB positioning base station A and the second UWB positioning base station B are arranged at two ends of the body of the robot respectively, the connecting line of AB passes through the center point G of the robot, and $AG=BG=W/2$. The coordinate of the point G is $(X1, Y1)$, and an angle of a present direction of the robot is $\alpha$. In the figure, the arrowed straight line passing through the point G represents the present direction of the robot, and the arrowed straight line is intersected with the line AB at a right angle. Therefore, $\angle a=\angle b=\angle\alpha$ may be obtained. For calculating the X-axis coordinate X11 of the first UWB positioning base station, it is necessary to calculate the distance between X11 and X1 at first, namely $X1-X11=AG*\cos a=(W*\cos\alpha)/2$, and in such case, $X11=X1-((W*\cos\alpha)/2)$. For calculating the Y-axis coordinate Y11 of the first UWB positioning base station, it is necessary to calculate the distance between Y11 and Y1, namely $Y11-Y1=AG*\sin a=(W*\sin\alpha)/2$, and in such case, $Y11=Y1+((W*\sin\alpha)/2)$. Similarly, for calculating the X-axis coordinate X12 of the second UWB positioning base station, it is necessary to calculate the distance between X12 and X1, namely $X12-X1=BG*\cos b=W*\cos\alpha/2$, and in such case, $X12=X1+((W*\cos\alpha)/2)$. The distance between Y1 and Y12 is $Y1-Y12=GB*\sin b=W*\sin\alpha/2$, and in such case, $Y12=Y1-((W*\sin\alpha)/2)$. According to the method of the embodiment for determining the coordinates of the first UWB positioning base station and the second UWB positioning base station, an algorithm for determining the coordinates of the two base stations can be simplified by limiting the position relationship that the base stations are mutually symmetric about the center point on the body of the robot, so that the data processing speed of the system is increased, and the coordinate values of the two base stations can be rapidly and accurately obtained to provide references for subsequent other data processing faster. Similarly, if three base stations are arranged, the third base station is arranged on a perpendicular bisector of AB, so that the algorithm can be simplified, and the data processing speed of the system can be increased. A specific implementation manner adopts the same principle of the embodiment and will not be elaborated herein.

Figure 5:
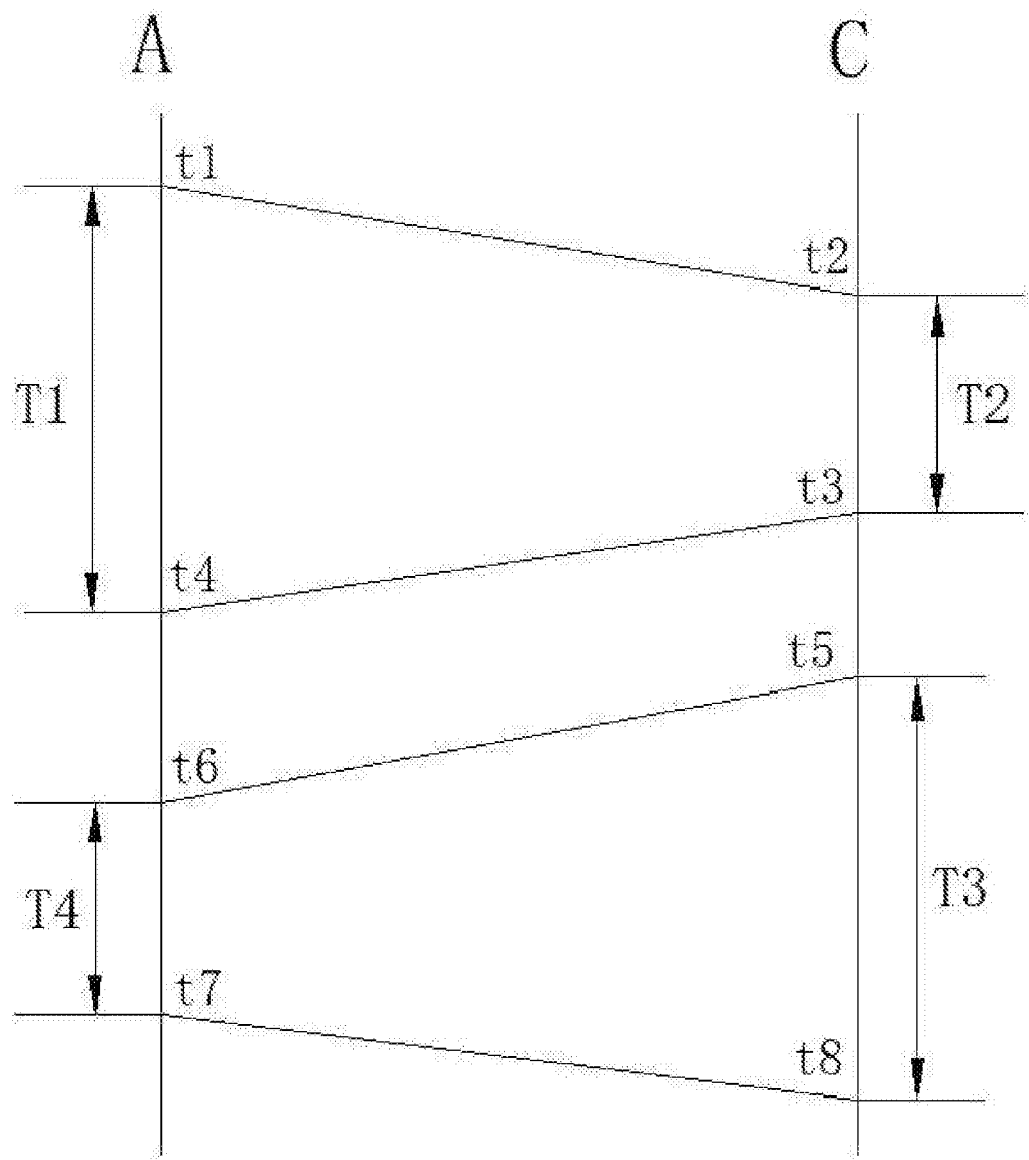

According to at least one alternative embodiment, the operation that it is determined that the first distance between the UWB positioning tag and the first UWB positioning base station is R1 and the second distance between the UWB positioning tag and the second UWB positioning base station is R2 includes: it is determined that a propagation speed of a radio wave is c; it is determined that a duration from a time point of sending distance measurement data to the UWB positioning tag by the first UWB positioning base station to a time point of receiving a confirmation signal of the UWB positioning tag is T11; it is determined that a duration from a time point of receiving by the UWB positioning tag, the distance measurement data sent by the first UWB positioning base station to a time point of sending the confirmation signal is T12; it is determined that a duration from a time point of sending distance measurement data to the first UWB positioning base station by the UWB positioning tag to a time point of receiving a confirmation signal of the first UWB positioning base station is T13; it is determined that a duration from a time point of receiving by the first UWB positioning base station, the distance measurement data sent by the UWB positioning tag to a time point of sending the confirmation signal is T14; it is determined that the first distance between the UWB positioning tag and the first UWB positioning base station is R1, $R1=c*(T11-T12+T13-T14)/4$; it is determined that a duration from a time point of sending distance measurement data to the UWB positioning tag by the second UWB positioning base station to a time point of receiving a confirmation signal of the UWB positioning tag is T21; it is determined that a duration from a time point of receiving by the UWB positioning tag, the distance measurement data sent by the second UWB positioning base station to a time point of sending the confirmation signal is T22; it is determined that a duration from a time point of sending distance measurement data to the second UWB positioning base station by the UWB positioning tag to a time point of receiving a confirmation signal of the second UWB positioning base station is T23; it is determined that a duration from a time point of receiving by the second UWB positioning base station, the distance measurement data sent by the UWB positioning tag to a time point of sending the confirmation signal is T24; and it is determined that the second distance between the UWB positioning tag and the second UWB positioning base station is R2, $R2=c*(T21-T22+T23-T24)/4$. As shown in FIG. 5, the first UWB positioning base station A sends the distance measurement data to the UWB positioning tag C at a moment t1, the UWB positioning tag C receives the distance measurement data at a moment t2 and sends the confirmation signal at a moment t3, and the first UWB positioning base station A receives the confirmation signal at a moment t4. In such case, it can be obtained that the duration required by the first UWB positioning base station A from sending of the distance measurement data to reception of the confirmation signal is $T1=t4-t1$ and the duration required by the UWB positioning tag C from reception of the distance measurement data to sending of the confirmation signal is $T2=t3-t2$, and it can be obtained that duration for signal transmission during a two-way communication between the first UWB positioning base station A and the UWB positioning tag C is $T1-T2=t4-t1-t3+t2$. Similarly, the UWB positioning tag C sends the distance measurement data to the first UWB positioning base station A at a moment t5, the first UWB positioning base station A receives the distance measurement data at a moment t6 and sends the confirmation signal at a moment t7, and the UWB positioning tag C receives the confirmation signal at a moment t8. In such case, it can be obtained that the duration required by the UWB positioning tag C from sending of the distance measurement data to reception of the confirmation signal is T3=t8−t5 and the duration required by the first UWB positioning base station A from reception of the distance measurement data to sending of the confirmation signal is T4=t7−t6, and it can be obtained that time for signal transmission during a two-way communication between the UWB positioning tag C and the first UWB positioning base station A is T3−T4=t8−t5−t7+t6. For ensuring the accuracy of the data, ¼ of (T1−T2+T3−T4) is determined as the duration for a signal transmission between the UWB positioning tag C and the first UWB positioning base station A. Since the transmission speed of the data signal is equal to the transmission speed c of the radio wave, distance=speed*time, and it can be obtained that the first distance between the UWB positioning tag and the first UWB positioning base station is R1=c*(T11−T12+T13−T14)/4. Similarly, it is obtained that the second distance between the UWB positioning tag and the second UWB positioning base station is R2, R2=c*(T21−T22+T23−T24)/4. A specific implementation manner is similar to the embodiment and will not be elaborated herein. According to the method of the embodiment for measuring the distance between the base station and the positioning tag, an average value of the data signal transmission duration may be extracted to obtain more accurate transmission duration, so that a more accurate distance measurement result is obtained, a more reliable reference is provided for subsequently determining the position of the pet, and a better pet monitoring effect is ensured.

Figure 6:
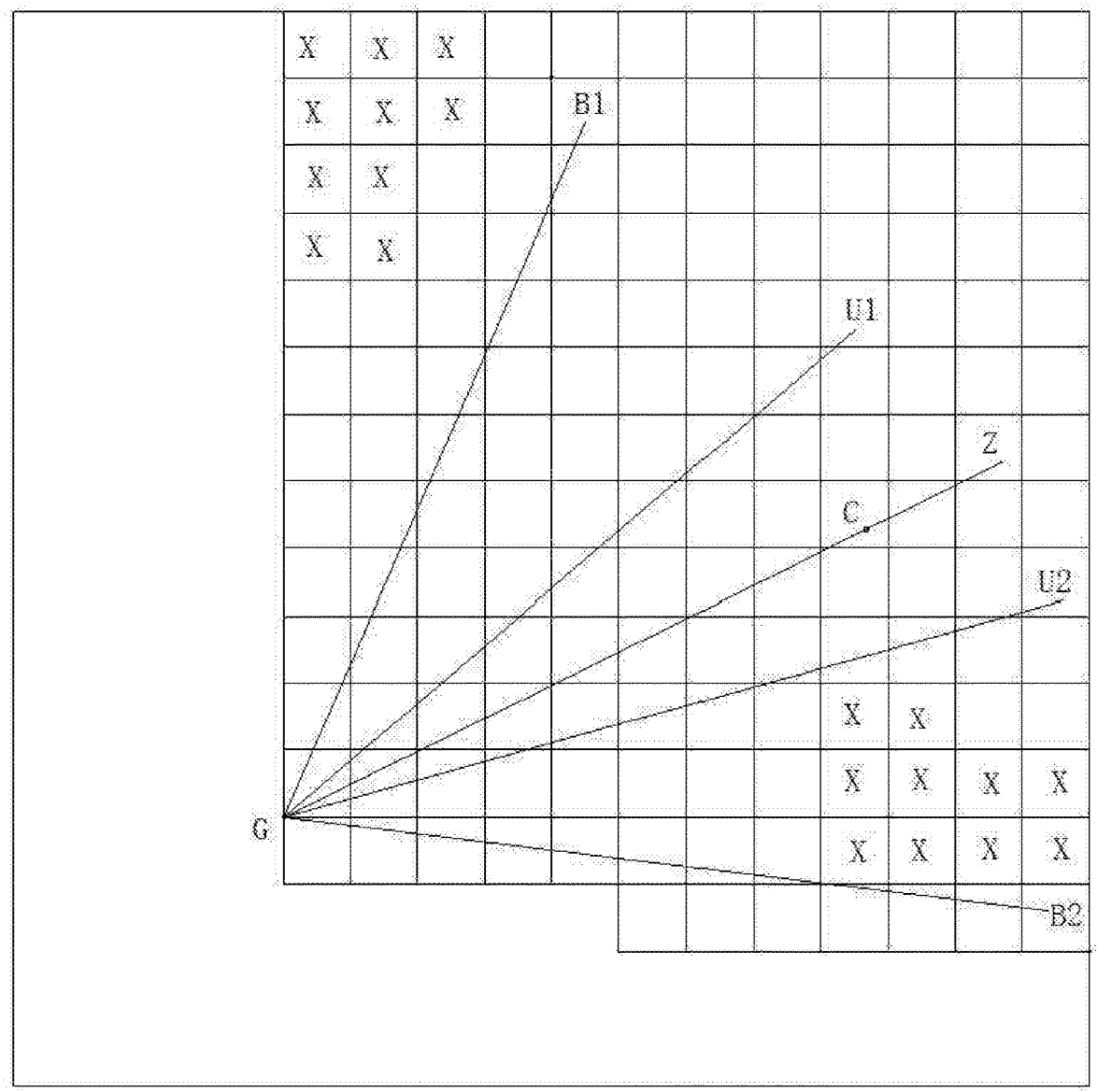
FIG. 6 is an analysis diagram of measuring a distance between a UWB positioning tag and a first UWB positioning base station.

According to at least one alternative embodiment, the operation in Step 3 that whether there is an obstacle cell or not in the grid cells in the preset range covered by the shooting angle of the camera through which the robot monitors the pet between the grid cell where the robot is located and the grid cell where the pet is located is judged includes: a direction that the camera through which the robot monitors the pet faces the pet is determined as the shooting direction; a shooting region covered by the shooting angle of the camera in the grid map is determined based on the shooting direction; and grid cells corresponding to a coverage region of an angle range in the grid map are determined, the angle range being formed by a first angle arm and second angle arm extending outwards by taking the camera as an angular vertex, and whether there is an obstacle cell or not in the grid cells corresponding to the coverage region is analyzed, the coverage region being smaller than and in the shooting region. As shown in FIG. 6, a small check in the figure represents a grid cell, the check marked with X represents that the check is an obstacle cell, and the check marked with nothing or marked with another letter represents that the check is a passed cell. The point G is the position point where the robot is located, i.e., the position of the camera, and the point C is the position point where the pet is located. GZ is the shooting direction, an angle formed by the two lines GB1 and GB2 is the shooting angle, and GZ is an angle bisector of the shooting angle. GU1 is the first angle arm, GU2 is the second angle arm, whether there is an obstacle cell or not in grid cells in the angle formed by the two lines GU1 and GU2 is analyzed, namely whether there is a check marked with X or not in checks in a range of ∠U1GU2 is judged, if YES, it is indicated that there is an obstacle cell, and if NO, it is indicated that there is no obstacle cell. In the figure, there is no obstacle cell in the range of ∠U1GU2, and the robot can normally shoot the pet. If there is an X check in the range of ∠U1GU2, it is indicated that the camera of the robot may be obstructed by an obstacle or the shot pet is too close to the obstacle and the shooting effect is influenced, and it is necessary to shoot the pet at another angle. According to the method of the embodiment, whether there is an obstacle cell between two position points or not is judged in combination with the grid map to determine whether there is an obstacle between the robot and the pet or not, and in such a manner, existing data of the robot is fully utilized, a judgment process is simple and practical, and a remarkable effect is achieved.

Figure 7:
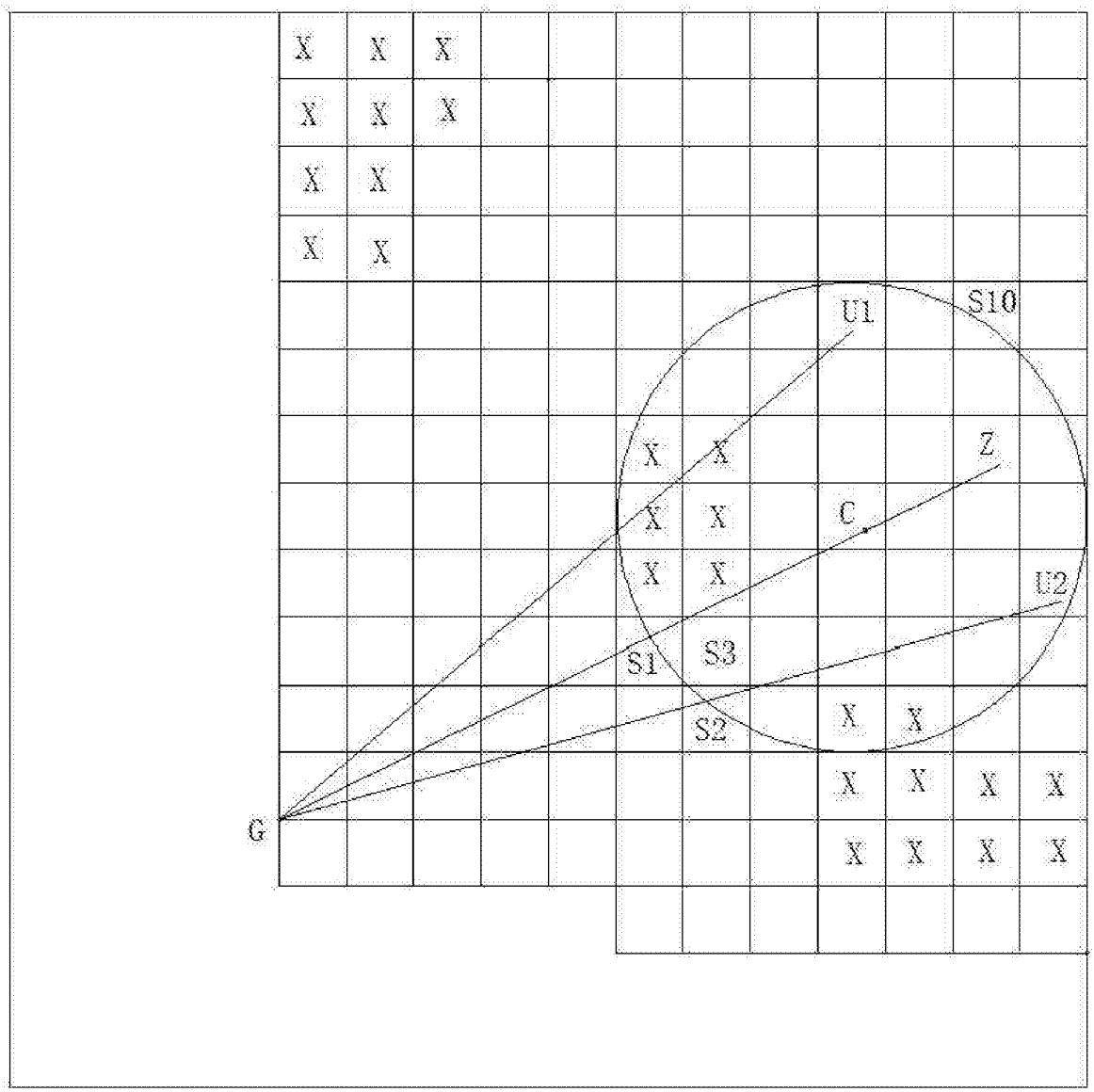
FIG. 7 is an analysis diagram of determining a monitoring cell.

According to at least one alternative embodiment, the operation in Step 4 that the preset region taking the grid cell where the pet is located as the center point is determined and the passed cells are determined as the monitoring cells to be determined one by one from short to long distance relationships between the passed cells in the preset region and the robot includes: a circular region taking a center of the grid cell where the pet is located as a circle center and taking a preset length as a radius is determined; a passed cell at a shortest distance away from the robot in the circular region is determined as a monitoring cell to be determined; if there is an obstacle cell in a straight grid path between the monitoring cell to be determined and the grid cell where the pet is located and a passed cell at a second shortest distance away from the robot in the circular region is not farthest from the robot, the passed cell at the second shortest distance away from the robot in the circular region is determined as a monitoring cell to be determined; if there is an obstacle cell in a straight grid path between the monitoring cell to be determined and the grid cell where the pet is located and a passed cell at a third shortest distance away from the robot in the circular region is not farthest from the robot, the passed cell at the third shortest distance away from the robot in the circular region is determined as a monitoring cell to be determined; and the same operations are executed; until the robot determines the passed cell at the second farthest from the robot in the circular region as the monitoring cell to be determined. As shown in FIG. 7, a small check in the figure represents a grid cell, the check marked with X represents that the check is an obstacle cell, and the check marked with nothing or marked with another letter represents that the check is a passed cell. The point G is the position point where the robot is located, i.e., the position of the camera, and the point C is the position point where the pet is located. GZ is the shooting direction, GU1 is the first angle arm, and GU2 is the second angle arm. Since there is an obstacle cell (i.e., a check marked with X) in the range of ∠U1GU2 and shooting of the robot may be obstructed by the obstacle, the robot is required to regulate a shooting position. At first, a circle is formed by taking the center of the grid cell where the point C is located as a circle center and taking the preset length as a radius, and the range enclosed by the circle is the preset region. The preset length may be correspondingly set according to a specific design requirement, may be set to be any value in a range of 1 to 2 meters, and is set to be 1.5 meters in the embodiment. It is to be noted that the circular region shown in FIG. 7 is merely schematic and the radius or diameter of the circle can not be measured by the length of the grid cell in the figure. In addition, if the circle region encloses only part of a grid cell, the grid cell is also in the range of the circular region. In the figure, the grid cell S1 is a passed cell at a shortest distance away from the robot in the circular region and is determined as a monitoring cell to be determined. Since there is an obstacle cell marked with X in the straight grid path between S1 and C (i.e., a path formed by grid cells that a straight line connecting S1 and C passes through), S1 cannot be determined as the monitoring cell. Then, the passed cell S2 at the second shortest distance away from the robot is analyzed. Since S2 is not a passed cell farthest from the robot in the circular region, the passed cell S2 at the second shortest distance away from the robot is determined as a monitoring cell to be determined. Since there is no obstacle cell marked with X in the straight grid path between S2 and C, namely there is no obstacle obstructing the robot from shooting the pet, S2 is determined as the monitoring cell, and the robot is navigated to the passed cell S2 to monitor the pet. If there is also an obstacle cell in the straight grid path between S2 and C, the passed cell S3 at the third shortest distance away from the robot is continued to be analyzed, and a method is the same as the abovementioned method and will not be elaborated. When there are obstacle cells in straight grid paths between all the passed cells, except S10, in the circular region and the robot, it is indicated that the pet is at a position surrounded by obstacles (for example, on a sofa, a tea table or a bed), and in such case, the obstacle cells between the passed cells and the pet are not required to be considered in the preset region and a position point relatively far from the position of the pet and far from the present position of the robot is required to be considered, so that the passed cell S10 farthest from the robot may be directly determined as the monitoring cell and the robot is navigated to the monitoring cell to monitor the pet. In such a manner of analyzing the passed cells in the preset region around the pet one by one from short to long distances away from the robots, a position point that the robot may reach fastest and where the pet may be effectively monitored may be found, so that efficiency of monitoring the pet by the robot is improved.

Figure 8:
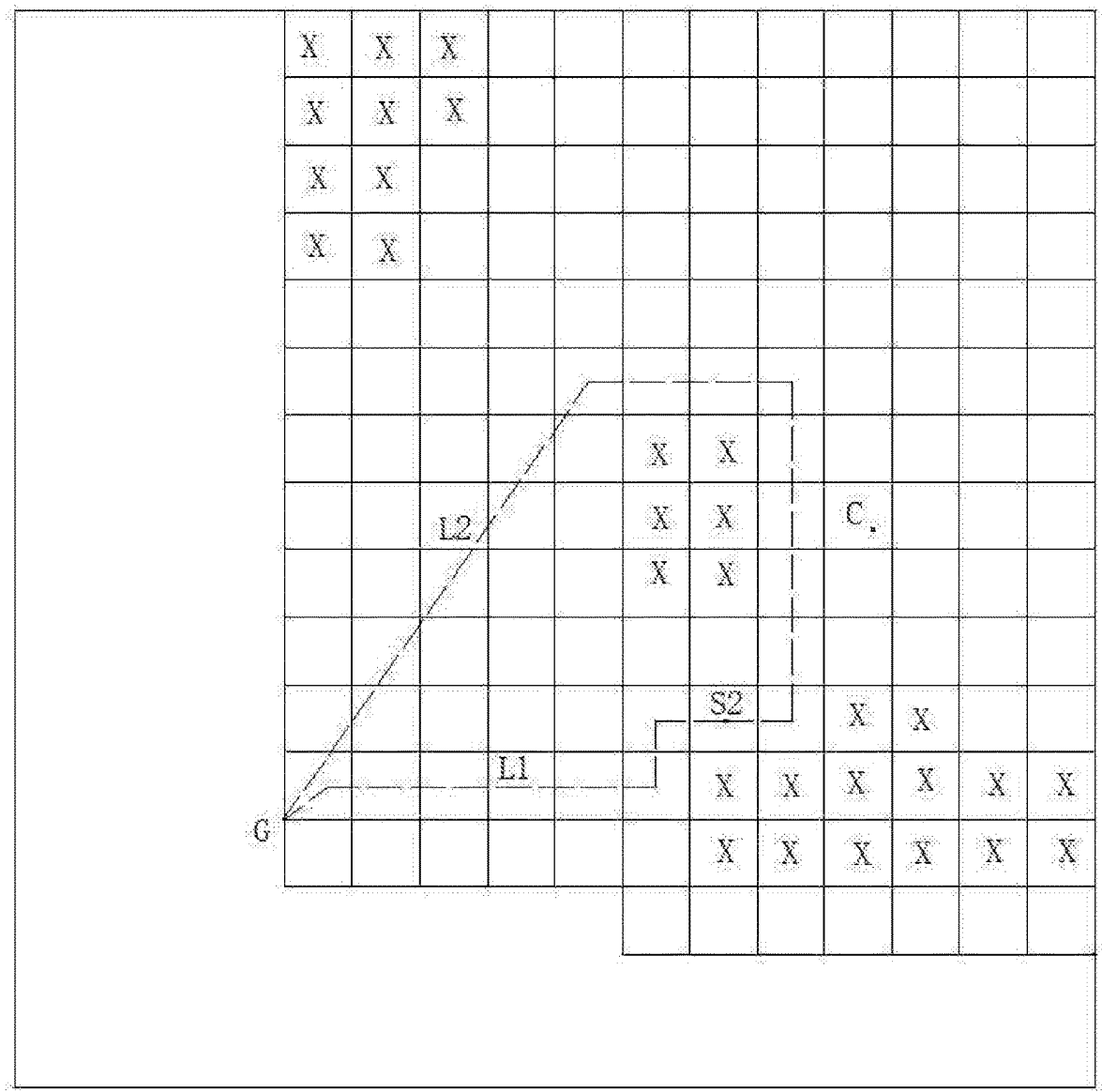
FIG. 8 is an analysis diagram of determining a navigation path of a robot from a present position point to a monitoring position point.

According to at least one alternative embodiment, the operation in Step 5 that the robot is controlled to walk from the present position to the monitoring cell to monitor the pet includes: the grid map is searched at a direction on the monitoring cell, from a starting point that is the present position point of the robot; a grid path with a shortest path length in grid paths directly connected by passed cells between the present position point of the robot and a center point of the monitoring cell is determined as a navigation grid path; center points of the grid cells in the navigation grid path are determined as navigation position points, and the navigation position points are connected into a navigation path; the robot is controlled to walk along the navigation path from the present position point to a monitoring position point; and a direction of the robot is regulated to ensure that the shooting direction of the camera of the robot is a direction of the pet. As shown in FIG. 8, if the robot is intended to walk from the point G to the monitoring cell S2, it is necessary to search a walking path at first. In the figure, a small check in the figure represents a grid cell, the check marked with X represents that the check is an obstacle cell, and the check marked with nothing or marked with another letter represents that the check is a passed cell. At first, the grid map is searched from the starting point that is the present position point G of the robot to the direction of the monitoring cell. Searching to the direction of the monitoring cell is not limited to searching to a linear direction of the monitoring cell and refers to searching the grid cells one by one from the point G to directions away from the point G around by taking the direction as a general searching trend and searching the grid cells one by one from the surrounding to the monitoring cell. Then, two grid paths are found, the first connecting the left lower part of the monitoring cell and the monitoring cell and the second connecting the right upper part of the monitoring cell and the monitoring cell, and the two grid paths are separated by an obstacle cell. A length of the first grid path is less than that of the second grid path, so that the first grid path is determined as a navigation grid path. Center points of the grid cells in the first grid path are determined as navigation position points, and the navigation position points are connected into a navigation path, i.e., the dotted line marked as L1 (the dotted line marked as L2 is a route of the second grid path). Next, the robot is controlled to walk along the route L1 from the point G to the center point of the monitoring cell S2 (i.e., the monitoring position point). Finally, the body of the robot rotates in place to ensure that the shooting direction of the camera of the robot is a direction facing the point C (i.e., the direction of the pet). According to the method of the embodiment, the grid map is searched to the direction of the monitoring cell, so that the specific grid paths reaching the monitoring cell can be determined rapidly. Then, a length of each path is analyzed to determine the shortest path as the navigation path, so that time required by the robot to reach the monitoring cell may be shortened. Finally, the center points of the grid cells are determined as the navigation position points, the navigation path formed by connecting each navigation position point is the best navigation path reaching the monitoring position point, and the robot walks along the navigation path, so that not only the time for reaching the destination can be shortened, but also the risk of encountering an obstacle in the walking process may be reduced, and the efficiency of reaching the monitoring position point for the robot may be improved. As an example embodiment, the side length of the grid cell shown in the figure of the embodiment is equal to a diameter of the body of the robot.

A chip of the disclosure is configured to store a program, the program being configured to control a robot to execute the abovementioned method for monitoring a pet by a robot based on a grid map. The chip is installed in the robot, so that the robot can determine the mutual position relationship between the pet and the robot through wireless communication between the wireless signal device on the pet and the robot and then judge whether there is an obstacle cell or not between the corresponding grid cells where the robot and the pet are located in the grid map to judge whether there is an obstacle between the robot and the pet or not. If NO, it is indicated that the pet may be effectively shot at the present position and shooting direction of the robot, the present position and shooting direction of the robot are not required to be changed, if the pet runs, the body of the robot may rotate to keep the camera always facing the direction of the pet, and in this process, the robot is not required to walk to another position unless there is an obstacle. If YES, it is indicated that no pet but an obstacle may be shot at the present position of the robot, so that the robot is required to judge states of grid cells around the pet to reselect a monitoring position point. The passed cells in the preset region around the pet are selected from short to long distance relationships with the robot and determined as monitoring cells to be determined one by one, then whether there is an obstacle cell or not in the straight grid path between the monitoring cell to be determined and the grid cell where the pet is located is judged, namely whether the pet may be effectively monitored or not at a position of the monitoring cell to be determined is analyzed, if there is no obstacle, the monitoring cell to be determined is determined as the monitoring cell, and if there is an obstacle, the next passed cell is analyzed. In such a manner of analyzing the passed cells in the preset region around the pet one by one from short to long distances away from the robots, a position point that the robot may reach fastest and where the pet may be effectively monitored may be found, so that efficiency of monitoring the pet by the robot is improved. In addition, if there are obstacles between all the other passed cells, except the passed cell farthest from the robot, in the preset region and the pet, the passed cell farthest from the robot is determined as the monitoring cell no matter whether there is an obstacle between it and the pet or not, and this is because distribution of obstacles has a characteristic under a normal condition, namely the obstacles may usually be concentrated in one region or some regions, if an obstacle cell is detected in a region, there may be other obstacle cells in the region, and if the robot detects an obstacle at the present position, in a certain range, the probability of occurrence of an obstacle is lower in a region farther from the present position. Therefore, determining the passed cell farthest from the robot in the preset range as the monitoring cell can ensure that the robot is in a relatively open region and, when the position of the pet changes, the monitoring position or monitoring angle may be conveniently regulated at a low probability of interference of an adjacent obstacle, which improves the monitoring efficiency. From the above, according to the chip of the disclosure, the robot may be controlled to find a relatively good monitoring position in such a manner of monitoring the pet in combination with the grid map, so that the problem that the pet is easily obstructed by an obstacle to influence the monitoring effect is solved, and the pet monitoring effect is improved.

The above embodiments are adopted not to limit but only to fully disclose the disclosure and all replacements made with equivalent technical characteristics based on the creative gist of the disclosure without creative work shall fall within the scope disclosed by the application.

What is claimed is:

1. A method for monitoring a pet by a robot based on a grid map, comprising:

Step 1: determining according to the grid map constructed by the robot, a present position point of the robot and a grid cell corresponding to the present position point of the robot, in the grid map;

Step 2: determining a mutual position relationship between the pet and the robot based on wireless communication between a wireless signal device on the robot and a wireless signal device on the pet, and determining according to the mutual position relationship, a present position point of the pet and a grid cell corresponding to the present position point of the pet;

Step 3: judging whether there is an obstacle cell or not in grid cells, in a preset range covered by a shooting angle of a camera through which the robot monitors the pet, and between the grid cell where the robot is located and the grid cell where the pet is located, when a judging result in Step 3 is NO, keeping a shooting direction of the camera of the robot facing to the pet and re-executing Step 2, and when the judging result in Step 3 is YES, entering Step 4;

Step 4: determining a preset region taking the grid cell where the pet is located as a center point, determining passed cells as monitoring cells to be determined one by one from short to long distance relationships between the passed cells in the preset region and the robot, judging whether there is an obstacle cell or not in a straight grid path between the monitoring cell to be determined and the grid cell where the pet is located, when a judging result in Step 4 is NO, determining the monitoring cell to be determined as a monitoring cell and entering Step 5, when the judging result in Step 4 is YES, judging whether a next passed cell is farthest from the robot or not, when a judging result is that the next passed cell is not farthest from the robot, re-executing Step 4, and when the judging result is that the next passed cell is farthest from the robot, directly determining the next passed cell as the monitoring cell and entering Step 5; and Step 5: controlling the robot to walk from the present position point to the monitoring cell to monitor the pet, wherein the obstacle cell is a corresponding grid cell where the robot detects an obstacle, and the passed cell is a grid cell that the robot has passed.

2. The method as claimed in claim 1, wherein the Step 1 comprises:

constructing according to data detected by the robot in a walking process, the grid map based on an XY-axis coordinate system taking (X0, Y0) as an origin;

determining that a side length of the grid cell in the grid map is L; and based on positioning data of the robot, determining that a coordinate of the present position point of the robot is (X1, Y1) and a grid coordinate of the grid cell corresponding to the present position point is (S11, S12), S11=(X1−X0)/L, S12=(Y1−Y0)/L, both S11 and S12 being integers.

3. The method as claimed in claim 2, wherein the Step 2 comprises:

determining that a distance between a first Ultra Wideband (UWB) positioning base station and a second UWB positioning base station on a body of the robot is W;

determining that a coordinate of the first UWB positioning base station is (X11, Y11) and a coordinate of the second UWB positioning base station is (X12, Y12);

based on wireless communication between each of the first UWB positioning base station and the second UWB positioning base station and a UWB positioning tag on the pet, determining that a first distance between the UWB positioning tag and the first UWB positioning base station is R1 and a second distance between the UWB positioning tag and the second UWB positioning base station is R2;

determining that an included angle between lines taking the first UWB positioning base station as an angular vertex and pointing to the second UWB positioning base station and the UWB positioning tag respectively is a first included angle, the first included angle being α1 and α1=arccos(($W^2+R2^2−R1^2$)/2*W*R2));

determining that an included angle between lines taking the second UWB positioning base station as an angular vertex and pointing to the first UWB positioning base station and the UWB positioning tag respectively is a second included angle, the second included angle being α2 and α2=arccos(($W^2+R1^2−R2^2$)/2*W*R1));

determining that a coordinate of a present position point of the UWB positioning tag is (Xc, Yc), Xc=X12+R2*cos(180°−α1-arccos((X12−X11)/W)) and Yc=Y11+R1*cos(180°−α2-arcsin((X12−X11)/W)); and determining that a grid coordinate of a grid cell corresponding to the present position point of the UWB positioning tag is (S21, S22), S21=(Xc−X0)/L, S22=(Yc−Y0)/L, both S21 and S22 being integers.

4. The method as claimed in claim 3, wherein determining that the coordinate of the first UWB positioning base station on the body of the robot is (X11, Y11) and the coordinate of the second UWB positioning base station is (X12, Y12) comprises:
- determining a coordinate of a center point of the body of the robot as the coordinate of the present position point of the robot, the coordinate being (X1, Y1);
- determining that the center point of the body of the robot is a midpoint of a connecting line of the first UWB positioning base station and the second UWB positioning base station;
- determining that a distance between the first UWB positioning base station and the second UWB positioning base station is W, a distance between the center point of the body of the robot and the first UWB positioning base station is W/2 and a distance between the center point of the body of the robot and the second UWB positioning base station is W/2;
- determining that a present direction, detected by a gyroscope of the robot, of the robot is $\alpha$;
- determining that the coordinate of the first UWB positioning base station on the body of the robot is (X11, Y11), X11=X1−((W*cos$\alpha$)/2) and Y11=Y1+((W*sin$\alpha$)/2); and
- determining that the coordinate of the second UWB positioning base station on the body of the robot is (X12, Y12), X12=X1+((W*cos$\alpha$)/2) and Y12=Y1−((W*sin$\alpha$)/2).

5. The method as claimed in claim 3, wherein determining that the first distance between the UWB positioning tag and the first UWB positioning base station is R1 and the second distance between the UWB positioning tag and the second UWB positioning base station is R2 comprises:
- determining that a propagation speed of a radio wave is c;
- determining that a duration from a time point of sending distance measurement data to the UWB positioning tag by the first UWB positioning base station to a time point of receiving a confirmation signal of the UWB positioning tag is T11;
- determining that a duration from a time point of receiving by the UWB positioning tag, the distance measurement data sent by the first UWB positioning base station to a time point of sending the confirmation signal is T12;
- determining that a duration from a time point of sending distance measurement data to the first UWB positioning base station by the UWB positioning tag to a time point of receiving a confirmation signal of the first UWB positioning base station is T13;
- determining that a duration from a time point of receiving by the first UWB positioning base station, the distance measurement data sent by the UWB positioning tag to a time point of sending the confirmation signal is T14;
- determining that the first distance between the UWB positioning tag and the first UWB positioning base station is R1, R1=c*(T11−T12+T13−T14)/4;
- determining that a duration from a time point of sending distance measurement data to the UWB positioning tag by the second UWB positioning base station to a time point of receiving a confirmation signal of the UWB positioning tag is T21;
- determining that a duration from a time point of receiving by the UWB positioning tag, the distance measurement data sent by the second UWB positioning base station to a time point of sending the confirmation signal is T22;
- determining that a duration from a time point of sending distance measurement data to the second UWB positioning base station by the UWB positioning tag to a time point of receiving a confirmation signal of the second UWB positioning base station is T23;
- determining that a duration from a time point of receiving by the second UWB positioning base station, the distance measurement data sent by the UWB positioning tag to a time point of sending the confirmation signal is T24; and
- determining that the second distance between the UWB positioning tag and the second UWB positioning base station is R2, R2=c*(T21−T22+T23−T24)/4.

6. The method as claimed in claim 1, wherein the Step 3 comprises:
- determining a direction that the camera through which the robot monitors the pet faces the pet as the shooting direction;
- determining according to the shooting direction, a shooting region covered by the shooting angle of the camera, in the grid map;
- determining grid cells corresponding to a coverage region of an angle range, in the grid map, the angle range being formed by a first angle arm and second angle arm extending outwards by taking the camera as an angular vertex, the coverage region being smaller than and in the shooting region; and
- analyzing whether there is the obstacle cell or not in the grid cells corresponding to the coverage region.

7. The method as claimed in claim 1, wherein the Step 4 comprises:
- determining a circular region taking a center of the grid cell where the pet is located as a circle center and taking a preset length as a radius;
- determining a passed cell at a shortest distance away from the robot in the circular region as a monitoring cell to be determined;
- if there is an obstacle cell in a straight grid path between the monitoring cell to be determined and the grid cell where the pet is located and a passed cell at a second shortest distance away from the robot in the circular region is not farthest from the robot, determining the passed cell at the second shortest distance away from the robot in the circular region as a monitoring cell to be determined;
- if there is an obstacle cell in a straight grid path between the monitoring cell to be determined and the grid cell where the pet is located and a passed cell at a third shortest distance away from the robot in the circular region is not farthest from the robot, determining the passed cell at the third shortest distance away from the robot in the circular region as a monitoring cell to be determined; and
- going on executing above operations on next passed cell;
- until the robot determines the passed cell at the second farthest from the robot in the circular region as the monitoring cell to be determined.

8. The method as claimed in claim 7, wherein the preset length is any value in a range from 1 meter to 2 meters.

9. The method as claimed in claim 1, wherein the Step 5 comprises:
- searching at a direction on the monitoring cell, the grid map from a starting point that is the present position point of the robot;
- determining a grid path with a shortest path length in grid paths directly connected by passed cells between the present position point of the robot and a center point of the monitoring cell as a navigation grid path;

determining center points of the grid cells in the navigation grid path as navigation position points, and connecting the navigation position points into a navigation path;

controlling the robot to walk along the navigation path from the present position point to a monitoring position point; and regulating a direction of the robot to ensure that the shooting direction of the camera of the robot is a direction of the pet.

10. A chip, configured to store a program, the program being configured to control the robot based on a grid map and execute the steps in accordance with claim 1.

11. A chip, configured to store a program, the program being configured to control the robot based on a grid map and execute the steps in accordance with claims 1 and 2.

* * * * *